R. C. SMITH.
CALCULATING SCALE.
APPLICATION FILED SEPT. 21, 1909.
1,014,344.
Patented Jan. 9, 1912.
2 SHEETS—SHEET 1.
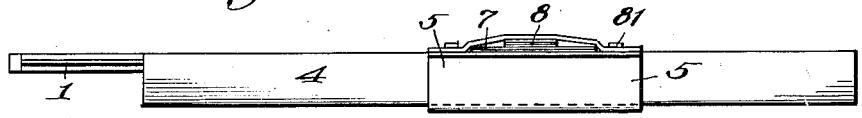
Fig. 1.
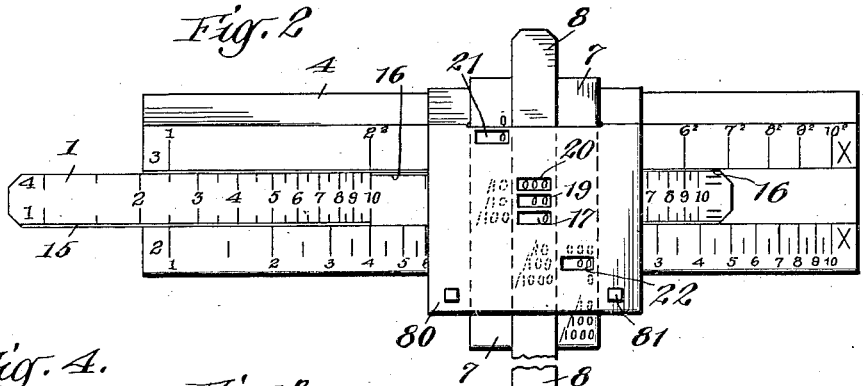
Fig. 2.
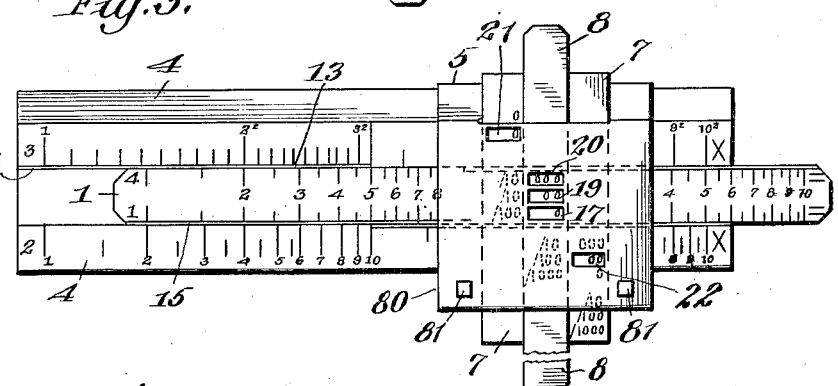
Fig. 4.
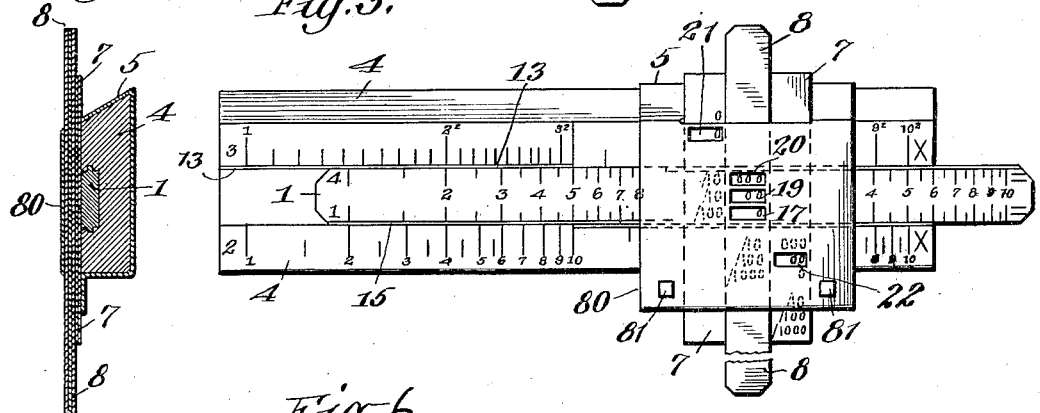
Fig. 3.
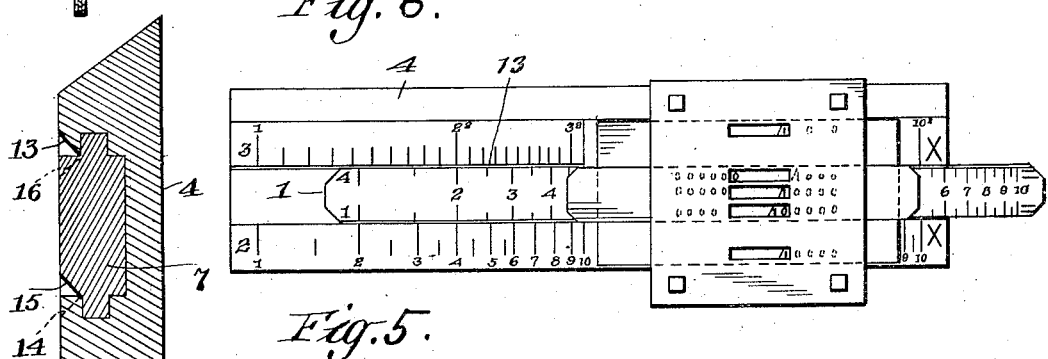
Fig. 6.
Fig. 4ᵃ
Fig. 5.
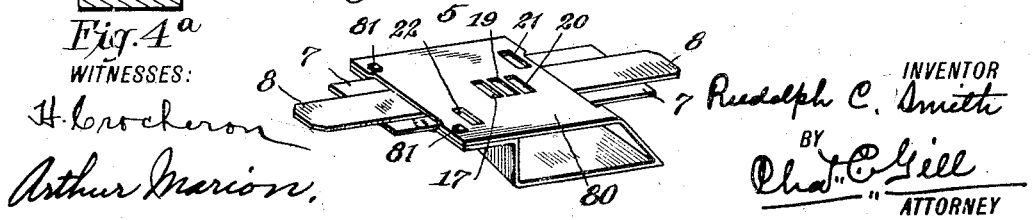
WITNESSES:
H. Crocheron
Arthur Marion
INVENTOR
Rudolph C. Smith
BY
Chas. C. Gill
ATTORNEY R. C. SMITH.
CALCULATING SCALE.
APPLICATION FILED SEPT. 21, 1909.
1,014,344.
Patented Jan. 9, 1912.
2 SHEETS—SHEET 2.
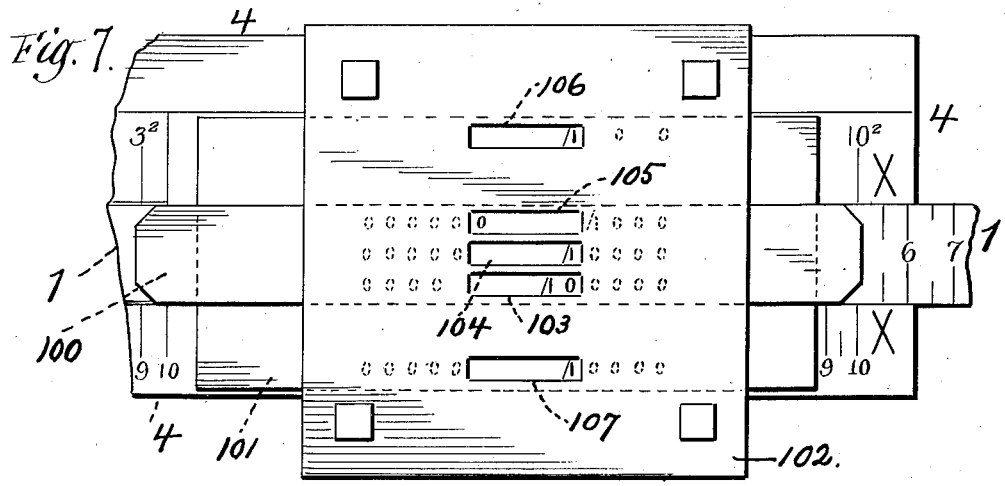
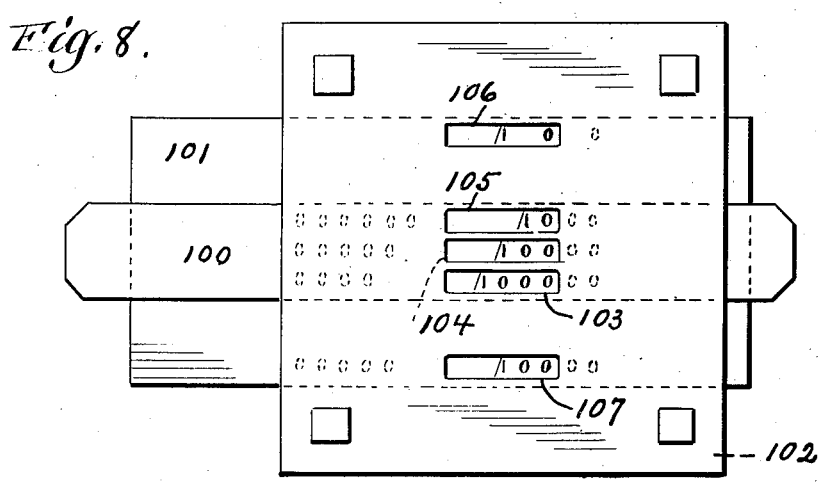
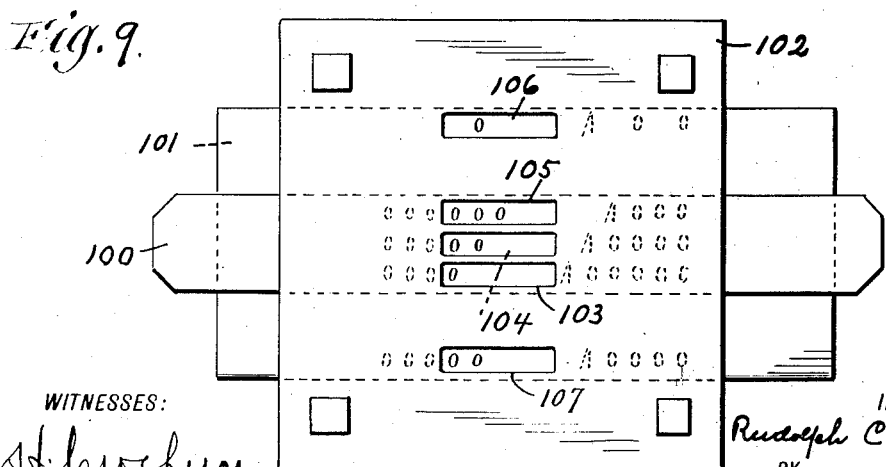
WITNESSES:
INVENTOR
Rudolph C. Smith
BY
Chas. E. Gill
ATTORNEY

UNITED STATES PATENT OFFICE.

RUDOLPH C. SMITH, OF YONKERS, NEW YORK.

CALCULATING-SCALE.

1,014,344. Specification of Letters Patent. Patented Jan. 9, 1912.

Application filed September 21, 1909. Serial No. 518,843.

*To all whom it may concern:*

Be it known that I, RUDOLPH C. SMITH, a citizen of the United States, and a resident of Yonkers, in the county of Westchester and State of New York, have invented certain new and useful Improvements in Calculating-Scales, of which the following is a specification.

The object of my invention is to construct an instrument which will in every case register mechanically the correct local value of the first left figure of numbers used in the operation of a logarithmic scale for calculations. Such an instrument, as is well known, is of the greatest utility, as it does away with the many chances of error caused by the necessity of constant mental attention, while using the ordinary slide.

The calculating scale of my invention comprises a main stock and slide and a cursor having a slide. The cursor registers the ciphers which must follow the first figure to give it its local value, in openings placed on the cursor to line with the horizontal row of their printed figures, and show their local value in ordinary notation.

The distinguishing feature of the calculating scale of my present invention is that I have provided special pointer lines on the main slide and on the main stock which form a dividing line of greater thickness by the move of the main slide and then point to the particular opening of the cursor in which mechanically is shown the number of ciphers for the correct local value of the first significant figure of those numbers which are used on the section of the logarithmic slide indicated by the greater thickness of the pointer.

The invention will be fully understood from the detailed description hereinafter presented, reference being had to the accompanying drawings, in which:

Figure 1 is a longitudinal side elevation of a calculating scale embodying my invention. Fig. 2 is a top plan view of the same with the main slide moved to the left. Fig. 3 is a top plan view of the calculating scale with the main slide moved to the right. Fig. 4 is a transverse section of the same. Fig. 4ª is an enlarged vertical section through the body of the main stock and main slide, and is presented to illustrate more clearly the beveling of the adjacent edges of the stock and slide to form the dividing lines and pointers. Fig. 5 is a detached perspective view of the cursor. Fig. 6 is a top plan view of a calculating scale embodying a modified form of my invention, the modification consisting in such an arrangement of the spaces of the cursor and the rows of ciphers on the auxiliary or cursor slide that the cursor slide may be moved horizontally, instead of vertically, as in Figs. 2 and 3; in Fig. 6 the main slide is shown as moved to the right the same as in Fig. 3. Fig. 7 is an enlarged top plan view, partly broken away, of the modified construction of the scale shown in Fig. 6, the modification relating mainly to the cursor or auxiliary slide and said slide being horizontally arranged and showing the ciphers in horizontal rows, with the ciphers for whole numbers on the left hand side and the ciphers for the fractions on the right hand side. Fig. 8 is a like view of the same but indicating a different position of the parts, with the cursor slide moved to the left. Fig. 9 is a similar view of the same, with the cursor slide shown as moved to the right.

The arrangement of the ordinary logarithmically-spaced slide-rule is well-known and needs no detailed description. It consists of a stationary part or stock 4 and of a slidable part or main slide 1 which can be moved to the desired place on the stationary part 4 in any suitable guides. The main slide 1 is preferably an elongated strip of hard wood on which are engraved the proper lines and characters as is usual on logarithmic slides. The stationary part or stock 4 of the main slide-rule is also preferably formed of hard wood and on it are engraved the usual logarithmic scales which if used with those on the slide 1 will register equal ratios, as is well-known. The slide 1 slides, as usual, in grooves of the stock. The slide 1 as well as the stationary part 4 are provided with any of the well-known logarithmic Gunter scales; but in my improved instrument the slide 1 and the stock 4 are provided with visible dividing lines constituting directive pointers which for every section of the slide visibly point to the particular openings of the cursor where the proper number of ciphers for a section must be made to appear. The visible mechanical dividing lines represent the ratios as in common notation, for instance:

$$\frac{2}{3} \quad \frac{4}{6} \quad \frac{8}{12}$$

The large printed figures of the slide-rule are the first left figures of the numbers used in the calculations and have the highest denomination, or the highest local value; for instance, in 550, "5" is the first left figure and its local value is 500.

The cursor 5 is arranged, in Figs. 2 and 3, transversely and adjustably on the main slide-rule and comprises a main part or stock 7 preferably of non-transparent material bearing the proper characters hereinafter referred to, a slide 8 preferably of non-transparent material thereon also bearing the proper characters, and a transparent celluloid sheet 80 folded around the main slide-rule upon the part 7 and slide 8 of the cursor, the ends of said sheet 80 where they come opposite to each other at the lower edge of the main slide rule being fastened by pieces of metal 81. The part 7 and slide 8 of the cursor are between the upper portion of the transparent sheet 80 and the upper surface of the main slide-rule and the slide 8 is upon the part 7; and at the upper edge of the main slide-rule the upper adjacent ends of the part 7 and slide 8 project through a slit in the folded edge portion of the sheet 80, while at the lower edge of the main slide-rule the lower adjacent ends of the part 7 and slide 8 project between the facing surfaces of the ends of the sheet 80 and also between the metal pieces or rivets 81, which serve as guides for said part 7. The upper portion of the sheet 80, which forms a part of the cursor 5, is provided with three index holes 17, 20, 19, coinciding with the equal spacing of the ciphers of the slide 8, by which the local value of the figures of the main slide is registered. The cursor 5 is also provided with index holes 21, 22, the hole 21 being preferably located in line with the printed figures on the main scale the ciphers of which it is intended to indicate, and the index hole 22 being preferably in line with the figures printed on the main scale the ciphers of which it is intended to indicate. The index hole 19 is preferably located in line with the printed figures on the main slide the ciphers of which it is intended to indicate. This arrangement just described of the index holes 21, 22 and 19 in register with the respective lines of printed numerals with which they coöperate affords an effectual guide to the user of the scale in making accurate readings thereof and consequently prevents mistakes.

The upper left half of the stationary part 4 is provided with a bevel horizontal material line 13 extending from the left end of the scale to the center dividing the spacing of the stationary scales in two halves. The right lower left half is provided with a material bevel line 14 extending from the middle to the right end. The slide 1 has a material bevel line below the figures of the left half, a material line 15 or any other prominent visible means, as for instance, a raised or grooved line extending to the middle, and a similar line 16 above the figures of the right half extending from the middle of the slide to the right end. The pointer and dividing lines 13, 14 on the main stock 4 and the pointer and dividing lines 15, 16 on the main slide 1 are preferably formed by beveling off the respective edges of said stock and slide, and when by the move of said slide these beveled portions of the stock and slide lie side by side, as at 13, 16 in Fig. 2, they become doubled and a V-shaped groove is created in the thus doubled section of said lines which very prominently acts as a pointer and thickened dividing line to point to the opening in the cursor in which the ciphers for the figures of the main slide 1 must be made to appear and read. The Fig. 2 shows the slide moved to the left, a position which shows the thickened dividing lines 13 and 16 above the figures of the slide for the section between the end of the lines of the slide, and those of the stationary part. These two lines point to the upper opening, and indicate that the figures of the section of the slide, where the edge of the cursor in fixing the position of the figure crosses two upper lines, have the ciphers indicating their local value in the opening to which these upper lines point. Fig. 3 shows the slide moved to the right and in this position there are lower thicker material dividing lines 16 and 15 pointing to the lower opening of the slide 8, in which the numbers of these figures on the section with the two lines must be read and taken. The figures of the outer sections of the slide have their ciphers in the middle opening to which the two horizontal lines above and below the figures point. If in using this arrangement of pointers on the slide of the figures and openings for the ciphers of the same, on cursor 5, each ratio of figures set on the logarithmic slide is accompanied by a setting of the local value of the figures expressed, in the opening of the cursor, the correct result of calculations performed on the logarithmic slide-rule can be read.

The figures on the auxiliary slide 8, and its stationary part 7 of the scale for the local values, are in three rows which contain, respectively, the ciphers of the rows of figures on the main scale with which they are horizontally in line, which rows of figures of the main scale are marked 3, 4, 1 and 2 (not as numerals of reference but as incorporated with the instrument), as shown on the left hand end of Figs. 2 and 3. It will be noticed that the upper row of the figures of the main stationary scale contains the square roots of the lower row of figures, while the slides have the same row of figures as the lower row of figures on the stationary part. The openings of the cursor 17, 19, 20, must be of the same spacing as the ciphers on the slide 8, and the stationary part; and the openings 21, 22 must be located properly, that when 19 in normal position of slide and stationary part shows 00, the upper opening must show 0, and the lower one 00. With this vertical distance it follows that the lower opening will show the same number of ciphers as the middle one, and the upper one will show half the number of ciphers, and with the equal spacing of the ciphers the same ratio will be maintained. I have discovered that this construction of the instrument is capable of registering the ciphers mechanically, following a very simple rule of operation, viz: Repeat every move of the cursor 5 and slide 1 of the main scale with the cursor 5 and slide 8 of the decimal-scale, using the numbers on the main scale and the ciphers of their first figures on the decimal slide. Read all decimals in line with the middle index 20 of the cursor 5; except for the figures on an inner thickened section, if on such a section the thickened dividing lines point to the upper opening, the ciphers must be read in the upper opening, and if the two lines on the slide point to the lower opening, the ciphers must be read and taken in the lower opening.

The instrument registers factors of ratios or proper and improper fractions, like:

$$\frac{1500}{600} \times \frac{80}{400} = 0.5 \text{ or } .5/10$$

by the following sequence of moves. At the commencement of the operation, the slides may be regarded as set in their respective zero positions, in which the figures on the slides coincide with those at the same place of the dividing line for their coöperating stationary parts. Then move the cursor 5 to aline with the figure "6" (this being the significant figure of the divisor "600" in our example) on the main slide 1; then move the stock 7 and slide 8 of the cursor 5 together until the two ciphers "00" on the slide 8 appear at the middle opening 19, and then move the slide 1 to the left until the fifteen division mark thereon (this being the first term of the ratio 1500) becomes in line with the left hand edge of the cursor. Then ordinarily or in the general use of the scale we would move the slide 8 but in this example we do not have to do so since the three ciphers "000" (which express the local decimal value of the first significant figure of 1500) on the slide 8 appear in the upper opening 20 to which the two upper lines 16 of the section where 15 is taken point, said three ciphers having, in this special example, attained their position in said opening 20 by the operation of placing the two ciphers in the middle opening 19 while fixing the value for "6". Now set the left hand edge of the cursor 5 to aline with "4" on the right-half of slide 1, and at this time we would ordinarily again move the slide 8 but it is not necessary in our example to do so since the two ciphers "00" already appear at the middle opening 19. Then move slide 1 to the right to replace the "4" by "8" at the left hand edge of the cursor, and at this time we would ordinarily or under the general rule move slide 8 but in our example it is not necessary to do so because the one cipher "0" already appears in the lower opening 17, having attained that position (with the lower lines 15 of the section containing the "8" pointing thereto) from the former operation; said one cipher representing the local value of the "8" in "80" or "0".

To read the result of the multiplication in the example given: move the parts 7 and 8 of the cursor together to show in the lower opening 22 the blank space on the part 7 which is between the "0" and "/10", which movement will also cause the "/10" on slide 8 to appear in the lower opening 17; since the two lower lines 15 of the slide 1 point to said lower opening 17. Over the figure "1" at the middle of the stationary part 4, we may then read the figure "5", which with the "/10" shown in the lower opening 17, stands for 5/10 or .5, and we thus read the result of the multiplication.

The general rule for the operation of the scale is to repeat every move of the cursor 5 and slide 1 with the cursor 5 and slide 8 of the decimal scale, using the numbers on the main scale and the ciphers of their first figures on the decimal scale, but in the example above given some of the repeat moves become unnecessary for the reasons explained.

In Figs. 6, 7, 8 and 9, I show a modification of the invention consisting in an arrangement permitting the cursor-slide to be moved longitudinally of the instrument instead of transversely. In Figs. 6 to 9 inclusive I number the cursor-slide 100 and the stock therefor 101. The cursor-slide 100 and its stock 101 are encompassed, as in Figs. 1 to 3 inclusive, by a transparent celluloid sheet 102 in which I form index openings numbered, respectively, 103, 104, 105, 106 and 107 corresponding with and used for the same purposes as the index openings 17, 19, 20, 21, 22 of the cursor shown in Figs. 2 and 3. I present Figs. 6 to 9 inclusive for the purpose of illustrating ciphers on the slide 100 arranged in horizontal rows, with the ciphers for whole numbers at the left-hand side of the middle portion of said slide and the ciphers for the fractions on the right-hand side of said portion. When the slide 100 is in the position shown in Fig. 7, a division line and the numeral "1" will appear in the opening 106, while in the openings 103, 104 and 105 will appear, respectively, a division line and "10", a division line and the numeral "1" and a cipher, and in the opening 107 will appear a division line and "1". In Fig. 8 the slide 100 is shown as having been moved partly to the left and in such position of said slide a division line and 10, meaning one-tenth, will appear in the opening 106, while in the openings 103, 104 and 105 will respectively appear a division line and "1000" (meaning .001), a division line and "100" (meaning .01), and a division line and "10" (meaning .1), and in the lower opening 107 will appear a division line and "100" (meaning .01). The movement of the slide 100 to the left brings the ciphers for fractions within the openings 103 to 107 inclusive, while the movement to the right of said slide will result in the ciphers for fractions being carried to the right and in the ciphers for whole numbers being exposed at said openings, as shown in Fig. 9. It will readily be seen that the auxiliary slide 100 and its stock 101, arranged as shown in Figs. 6 to 9 inclusive, may be used for exactly the same purpose as the corresponding parts of Figs. 2 and 3, in one case the slide and stock being arranged horizontally and in the other case vertically or transversely of the main stock and main slide.

What I claim as my invention and desire to secure by Letters Patent, is:

1. In combination with the logarithmic slide-rule, an auxiliary slide-rule of equal spacing and marked with a continuous series of the ciphers of powers of ten, a cursor therefor having indexes of the same spacing as the auxiliary series of ciphers, dividing line pointers on the slide and stock of the logarithmic slide-rule to point in a direction to the special index of the cursor for the ciphers determining the local value of the figures on the main slide, said pointers being formed by beveling the contiguous edges of the main slide and stock and said beveled portions being arranged to in part lie side by side or overlap each other and thereby become thicker on the move of the main slide and then direct the eye of the user to the index in the cursor in which the ciphers for the figures of the main slide must be made to appear and read.

2. In combination with the logarithmic slide-rule, an auxiliary slide-rule of equal spacing and marked with a continuous series of the ciphers of powers of ten, a cursor therefor having indexes of the same spacing as the auxiliary series of ciphers, dividing line pointers on the slide and stock of the logarithmic slide-rule to point in a direction to the special index of the cursor for the ciphers determining the local value of the figures on the main slide, said auxiliary slide being arranged longitudinally of the main rule and bearing at one side of a middle portion the ciphers for whole numbers and at the other side thereof the ciphers for the fractions in horizontal rows, said pointers and dividing lines being formed by beveling the contiguous edges of the main slide and stock and said beveled portions being arranged to in part lie side by side or overlap and thereby become thickened on the move of the main slide and then indicate the index in the cursor in which the ciphers for the figures of the main slide must be made to appear and read.

3. In combination with the logarithmic slide-rule, an auxiliary slide arranged longitudinally of the main rule and bearing in horizontal rows at one side of a middle portion the ciphers for whole numbers and at the other side thereof the ciphers for the fractions, a cursor for said auxiliary slide having indexes to which the said ciphers are moved and pointers on the slide and stock of the logarithmic slide-rule to point in a direction to the special index of the cursor in which the ciphers for the figures of the main slide must be made to appear and read, said pointers being longitudinal lines formed by beveling the contiguous edges of the main slide and stock and said beveled portions being arranged to in part lie side by side or overlap and thereby become doubled on the move of the main slide and then point to the proper index of the cursor in which is shown the number of ciphers for the correct local value of the first significant figure of those numbers which are used on the section of the logarithmic slide indicated by the double-line or overlapping portions of the pointer.

4. A logarithmic slide-rule comprising a main slide and stock, said main slide and stock having dividing line pointers formed by beveling the contiguous edges thereof and said beveled portions being arranged to in part lie side by side or overlap and thereby become doubled on the move of the main slide and then point to the proper index of the cursor in which is shown the number of ciphers for the correct local value of the first significant figure of those numbers which are used on the section of the logarithmic slide indicated by the thickened line or overlapping portion of the pointer.

Signed at New York city, in the county of New York, and State of New York, this 20th day of September A. D. 1909.

RUDOLPH C. SMITH.

Witnesses:
CHAS. C. GILL,
ARTHUR MARION.